United States Patent
Takehara et al.

[11] Patent Number: 5,821,647
[45] Date of Patent: Oct. 13, 1998

[54] SPINDLE MOTOR

[75] Inventors: Isamu Takehara; Hirotada Shimaguchi; Masashi Ogawa, all of Narashino, Japan

[73] Assignee: Seiko Seiki Kabushiki Kaisha, Japan

[21] Appl. No.: 760,450

[22] Filed: Dec. 6, 1996

[51] Int. Cl.$^6$ .............. H02K 7/00; H02K 5/16; G02B 26/08
[52] U.S. Cl. .......... 310/67 R; 310/90; 310/261; 359/198; 359/200; 359/216
[58] Field of Search .................. 310/67 R, 90, 310/261; 359/200, 198, 216

[56] References Cited

U.S. PATENT DOCUMENTS

| | | | |
|---|---|---|---|
| 4,805,972 | 2/1989 | Tanaka et al. | 350/6.7 |
| 5,254,893 | 10/1993 | Ide | 310/90 |
| 5,325,006 | 6/1994 | Uno et al. | 310/90 |
| 5,434,695 | 7/1995 | Saito et al. | 359/200 |
| 5,463,490 | 10/1995 | Seto | 359/200 |
| 5,493,161 | 2/1996 | Uno et al. | 310/156 |
| 5,535,582 | 7/1996 | Paweletz | 57/414 |
| 5,541,462 | 7/1996 | Nii et al. | 310/90 |
| 5,555,715 | 9/1996 | Paweletz et al. | 57/414 |
| 5,617,241 | 4/1997 | Kitazawa | 359/200 |

*Primary Examiner*—Thomas M. Dougherty
*Assistant Examiner*—Michael J. Wallace, Jr.
*Attorney, Agent, or Firm*—Adams & Wilks

[57] ABSTRACT

A spindle motor comprises a rotational member supported by bearings for rotation about a rotational axis, a rotational body and a motor rotor mounted on the rotational member for rotation therewith, and a motor stator mounted around the motor rotor. The rotational body has an outer diameter determined so that a windage loss of the rotational body is proportional to the third power of a peripheral velocity of the rotational body and an air gap diameter of the bearings and the diameter of the motor stator are determined so that the air loss of each of the bearings and the motor rotor is proportional to the square of the peripheral velocity of each of the bearings and the motor rotor at a range of constant speed of rotation of the rotational member.

24 Claims, 5 Drawing Sheets

SPINDLE MOTOR

BACKGROUND OF THE INVENTION

The present invention relates to a polygon scanner motor used for laser scanning-like laser beam printers and copy machines, and a spindle motor applicable for VTR drum spindles.

In the prior art polygon scanner motor, ball bearings generally have been used for bearings and have been rotated at about 20000 rpm.

Because of the recent acceleration of data processing, a polygon mirror needs accelerating revolution: more than 30000 rpm. At such revolution, a dynamic pressure air bearing using air as lubricating fluid is used because of the life of the bearing and to protect the polygon mirror from stains caused by scattered lubricant (see, for example, the Journal of Precision Society, Vol. 61, No. 9, 1995, Page 1284).

As ambient noise of the polygon mirror becomes large by accelerating revolution of the above-mentioned polygon mirror, the polygon mirror portion tends to be shut tightly to prevent exposure to the ambient noise.

Moreover, recent polygon scanner motors have required high rotational accuracy, miniaturization and acceleration.

However, any attempt to make a polygon scanner motor having acceleration and high rotational accuracy(constant speed), and to miniaturize the polygon scanner as mentioned above results in the problems that the output of the motor becomes small and its heating value becomes large because the ratio Tloss/Tout of friction torque Tloss to output torque Tout becomes large, thereby worsening the efficiency of the polygon scanner motor.

To solve the foregoing problems with the prior art, improvements are needed in both the generation of the output torque and the reduction of friction.

To improve the generation of output torque, it is required to minimize the ratio Tout/$\Delta$T of output torque Tout to cogging torque (torque irregularity) $\Delta$T and to minimize rotating fluctuation. It is also required to minimize the ratio Wout/Wloss of output Wout to core loss Wloss.

Next, to improve the reduction of friction, it is required to minimize the ratio Ti/Td of the drag torque Td to sudden torque Ti in order to maintain the rotating accuracy and the life of the bearing. It is also required to minimize the drag torque Td to keep the ratio Ti/Td small.

Although it is proposed to improve the generation of the output torque to solve the foregoing problems with the prior art, it is difficult to miniaturize the motor without decreasing the output torque. Especially in a polygon scanner motor, the polygon mirror generally can not be miniaturized because the size of the polygon mirror is fixed. Thus, it becomes difficult to miniaturize the motor without decreasing the output torque.

On the other hand, although it is proposed to miniaturize the bearing to decrease the generation of mechanical friction, it is undesirable because miniaturization of the bearing causes deterioration of life at a required accelerating rotation.

Although it has not been easy to realize a motor having an accelerating rotation, a high rotation accuracy, and a miniaturized size, continued research has been undertaken by the inventors.

As the result of the research, new knowledge has been gained. That is, it is generally considered that windage loss occurring at a polygon mirror which is loaded causes deterioration in efficiency which increases loss when the polygon scanner motor rotates, but even if the spindle motor is rotated at an accelerating rotation, miniaturization without rotation fluctuation is realized using windage loss occurring at the accelerating rotation.

The polygon scanner motor has a problem that the polygon mirror moves at an accelerating rotation if the polygon mirror is not fixed tight on the rotational axis. Especially when the heating value of the polygon mirror increases because of an increase in windage loss by the accelerating rotation, the motor has a problem that a flange fixing the polygon mirror becomes loose at the rotational axis and the polygon mirror is easily moved when the temperature of the fixed portion falls after heating.

In the case that the polygon mirror is set on the rotational axis through the flange, it needs to be machined for correction of run out in order to achieve squareness after the flange is assembled and fixed on the rotational axis.

The present invention was born on the above-mentioned new knowledge. The object of the present invention is to provide a spindle motor having no rotation fluctuation, a miniaturized size, and a long life.

Another object of the present invention is to provide a spindle motor having a load, such as a polygon mirror, which does not become loose and does not move after the load is fixed on the rotational axis.

SUMMARY OF THE INVENTION

The present invention comprises a shaft supported so as to rotate freely on bearings about a rotational axis, a rotational body and a motor rotor coaxially mounted on the shaft, and a motor stator fixed around the motor rotor. The outer diameter of the rotational body is determined so that windage loss of the rotational body is proportional to the third power of the peripheral velocity of the rotational body, and the air gap diameter of the bearings and the diameter of the motor stator are determined so that the air loss of each of the bearings and the motor rotor is proportional to the square of the peripheral velocity of each of the bearings and the motor rotor at the range of constant speed rotation of the shaft. According to the above-mentioned means, the present invention achieves the foregoing object.

According to another aspect of the present invention, the rotational body is bored at its center and is mounted on a taper portion formed at one end of the shaft of the spindle motor. The rotational body is fixed to the taper portion of the shaft by tightening a screw in a direction opposite to the normal direction of rotation of the shaft. According to the above-mentioned means, the present invention achieves the foregoing object.

In another aspect of the present invention, the rotational body comprises a polygon mirror covered with a case. According to the above-mentioned means, the present invention achieves the foregoing object.

The present invention further achieves the above-mentioned object by the following means: the ratio $\phi b/\phi p$ of the outer diameter $\phi p$ of the rational body to air gap diameter $\phi b$ of the bearings is limited to $\phi b/\phi p \leq \frac{1}{3}$, and the ratio $\phi m/\phi p$ of the outer diameter $\phi p$ of the rational body to the outer diameter $\phi m$ of the motor rotor is limited to $\phi m/\phi p \leq \frac{1}{3}$ in the spindle motor.

The present invention further achieves the above-mentioned object by the following means: the rotational body comprises a polygon mirror and a mounting or set portion for setting the polygon mirror, and the set portion is tightened by a screw to the taper portion of the shaft of the spindle motor.

DETAILED DESCRIPTION OF THE PREFERRED EMBODIMENT

The fundamental aspects of the present invention are described with reference to FIGS. 1–8.

Figure 1:
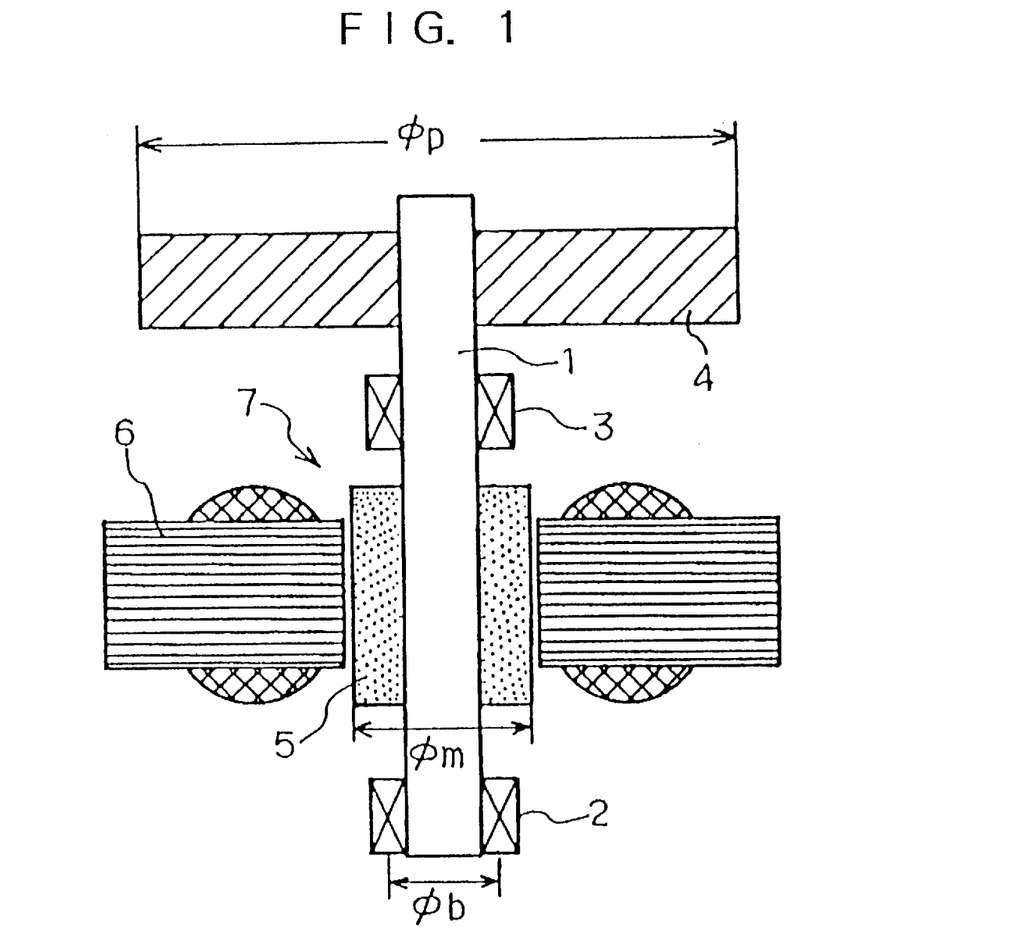
FIG. 1 is a sectional view showing only the main components of the invention for explaining the fundamental viewpoint of the present invention.

FIG. 1 is a view of the main components for explaining the fundamental aspects of the present invention.

In the present invention shown in FIG. 1, a rotational member comprising a shaft 1 is supported by a pair of bearings 2 and 3 for undergoing free rotation about a rotational axis, a rotational body 4 comprising, for example, a circular plate or a polygon plate, and a motor rotor 5 are coaxially mounted on the shaft 1, a motor stator 6 is fixed around the motor rotor 5, and a motor 7 consists of the motor rotor 5 and the motor stator 6.

By the foregoing construction of the present invention, the following points are observed: windage loss occurring on the rotational body 4 is used for its air damper; the effect of the air damper is proportional to the windage loss; and the windage loss suddenly increases when a peripheral velocity at the periphery of the rotational body 4 is greater than a stated value (30 m/s.)

Therefore, in the present invention, while windage loss occurring at the rotational body 4 is made as large as possible, windage loss occurring at rotational portions other than the rotational body 4 is made as small as possible, and the effect of air damper is occurred intensively at the rotational body 4.

It is known by experiments that windage loss at a rotating portion of the motor is proportional to the square of the peripheral velocity Va when the peripheral velocity Va of the rotating portion is less than 30 m/s, and is proportional to the third power of the peripheral velocity Va when the peripheral velocity Va of the rotating portion is more than 30 m/s.

In the present invention, while the outer diameter of rotational body 4 is determined so that the velocity at the periphery of the rotational body 4 is more than 30 m/s at a range of constant speed rotation of the shaft 1, the outer diameter of the motor rotor 5 is determined so that the velocity at the periphery of the motor rotor 5, which is another rotating portion, is less than 30 m/s.

Next, based on the foregoing viewpoint, it is described how to concretely determine sizes of the rotational body 4.

Defining the outer diameter of the rotational body 4 as $\phi p$ [mm], the velocity Va at the periphery of the rotational body 4 is expressed with expression (1) when the rotational body 4 rotates at a number of rotations N [rpm].

$$Va = \pi \cdot \phi p 10^3 \times N/60 \, [m/s] \tag{1}$$

When the rotational body 4 rotates at 10000 [rpm], the outer diameter $\phi p$ of the rotational body 4 when the velocity Va at the periphery of the rotational body 4 is 30 [m/s] becomes 57.3 [mm] by the expression (1). That is, the outer diameter $\phi p$ corresponding to a boundary where windage loss acting on the periphery of the rotational body 4 changes from the square to the third power of peripheral velocity.

Similarly, when the number N of rotations is 20000 [rpm], 30000 [rpm], 40000 [rpm], and 50000 [rpm], the outer diameter $\phi p$ of the rotational body 4 when the velocity Va at the periphery of the rotational body 4 is 30 [m/s] becomes 28.6 [mm], 19.1 [mm], 14.3 [mm], and 11.5 [mm], respectively, from the expression (1).

Figure 2:
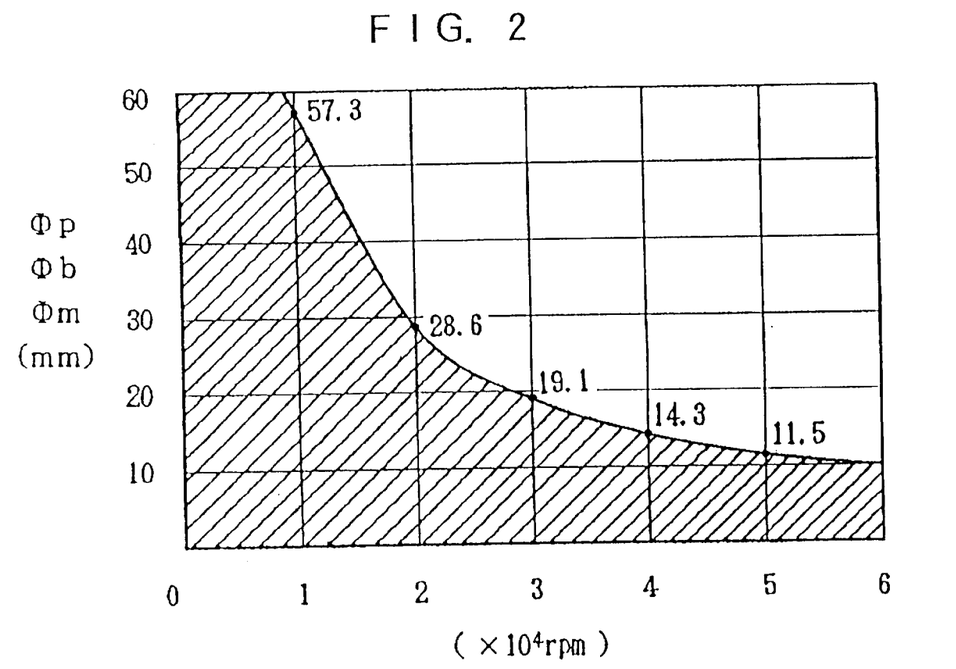
FIG. 2 is a graph showing the external diameter of the rotational body when a peripheral velocity of the external periphery of the rotational body is 30 [m/s] at some number of rotations of the rotational body.

By plotting the results on a figure and connecting each point, the curve shown in FIG. 2 is obtained.

As shown in FIG. 2, the requirements for using windage loss occurring at the periphery of the rotational body 4 effectively when the rotational body 4 rotates steadily at some number of rotations are that the outer diameters $\phi p$ of the rotational body 4 are on the upper side of the curve in FIG. 2 and that the outer diameter of the rotational portions other than for the rotational body 4, that is, air-gap diameter $\phi b$ of the bearing 2 or 3 and the outer diameter $\phi m$ of the motor rotor 5 are on the lower side, that is, the oblique line side, of the curve in FIG. 2.

Therefore, when the number of steady rotations is 50000 [rpm], it is required that the outer diameter $\phi p$ of the rotational body 4 is more than 11.5 [mm] and that the outer diameter of the rotational portions other than the rotational body 4 is less than 11.5 [mm].

In the present invention, it is required that outer diameters of the rotational body 4 and the rotational portions other than the rotational body 4 be on different areas of FIG. 2. In the embodiment of the present invention, adding such requirements, it is desirable that the relation between the outer diameter of the rotational body 4 and the outer diameter of the rotational portions other than the rotational body 4 is determined as mentioned below because of the required actual size of the rotational body 4 and torque of the motor 7.

In relation to the diameters of FIG. 1, the ratio $\phi b/\phi p$ of the outer diameter $\phi p$ of the rotational body 4 to air gap diameter $\phi b$ of the bearing 2 (or bearing 3) is limited to the expression (2), and the ratio $\phi m/\phi p$ of the outer diameter $\phi p$ of the rotational body 4 to outer diameter $\phi m$ of the motor rotor 5 is limited to the expression (3).

$$\phi b/\phi p \leq \frac{1}{3} \tag{2}$$

$$\phi m/\phi p \leq \frac{1}{3} \tag{3}$$

Here, the outer diameter $\phi p$ is the volume determining the size of the rotation 4. If the rotational body 4 is a disk plate, the size is regarded as the outer diameter. If the periphery of the rotational body 4 is a polygon body, like a polygon mirror, the size is regarded as the mean outer diameter which is the mean value of an inscribed circle diameter of the polygon forming a flat face of the polygon mirror and the circumscribed circle diameter of the polygon. That is similar in the explanation below.

The air gap diameter φb is the volume determining the size of the bearing 2. The size is regarded as a pitch circle diameter of a track of rolling element in an anti-friction bearing. In a slide bearing, a hydrodynamic bearing, and a magnetic bearing, the size is regarded as the air gap distance between the rotational axis (or fixed axis) and the rotation housing (or fixed housing.)

In the present invention having such a structure, windage loss occurring on the rotational body 4 at steady rotation, that is loss occurring because the periphery of the rotational body 4 has a friction with air, becomes very large and operates as an air damper because the air damping effect acts intensively at the periphery of the rotational body 4 by the windage loss. Therefore, the air damping effect prevents rotation of the rotational body 4 from fluctuating and decreases vibration and shock caused by the rotational body 4 to the bearings 2 and 3, thereby increasing the life of the spindle motor.

Figure 3:
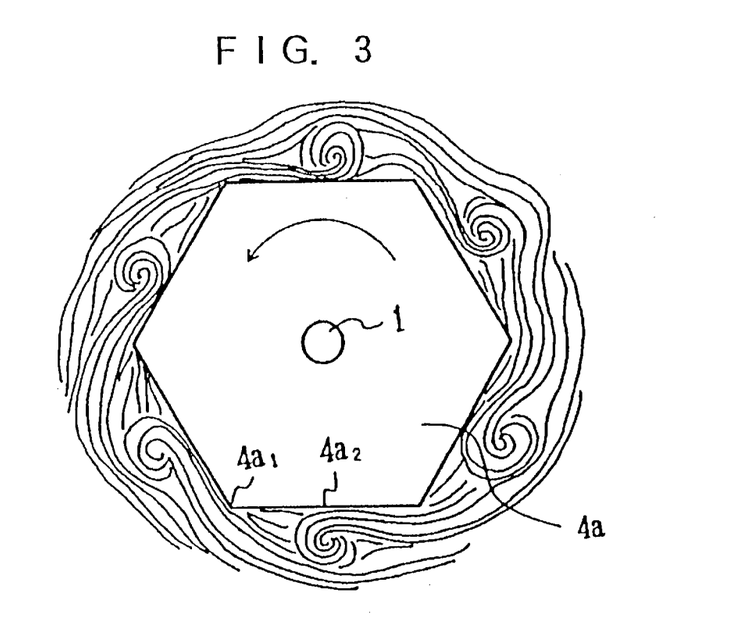
FIG. 3 is a plan view explaining the air damping effect of air flow occurring at the surroundings when the rotational body comprises a polygon plate, such as a polygon mirror.
Figure 4:
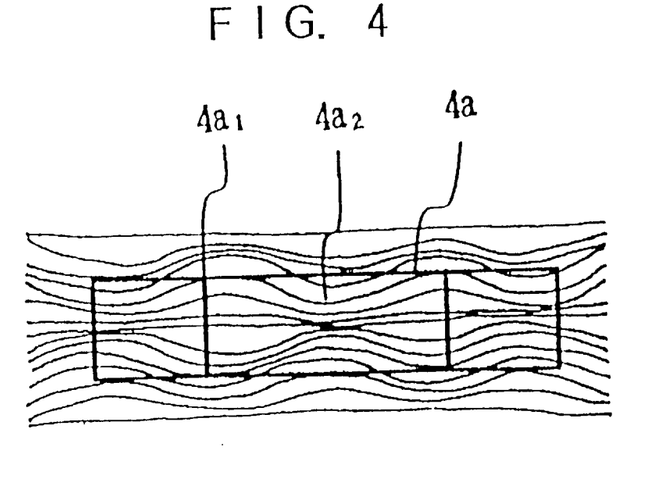
FIG. 4 is a front view of the rotational body shown in FIG. 3.

When the rotational body 4 is arranged with a rotational body 4a comprising a polygon plate like a polygon mirror as shown in FIGS. 3 and 4, the above-mentioned air damping effect by windage loss acts at the periphery of the rotational body 4a. Moreover, it is supposed to act as an air damping effect as described below.

As the peripheral velocity of the corner portion $4a_1$ becomes larger in comparison to the corner portion $4a_1$ with the plane portion $4a_2$ of the rotational body 4a, it is supposed that air flow occurs as shown in FIGS. 3 and 4. As a result, the air flow of the corner portion $4a_1$ of the rotational body 4 becomes dense and the air flow of the plane portion $4a_2$ does not become dense.

Figure 5:
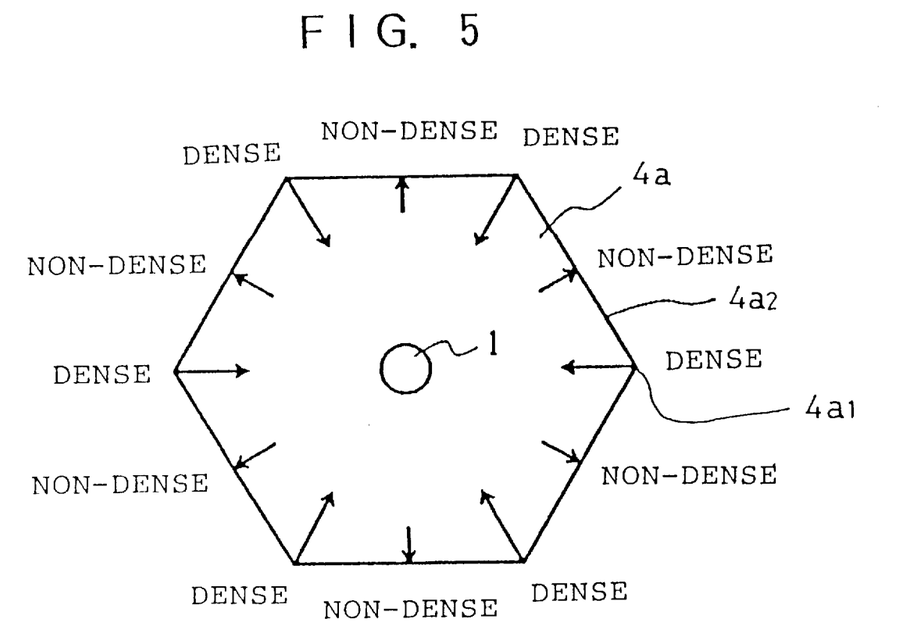
FIG. 5 is an explanatory view showing typically a force occurring at the peripheral face of the rotational body shown in FIG. 3.

A force acting upon the periphery of the rotational body 4a is shown in FIG. 5 according to the dense condition of the air. It is considered that the force acts as an air damper of the rotational body 4a, and that the air damper acts upon the rotational body 4a helping with the air damping effect by the above-mentioned windage loss.

Therefore, in the rotational body 4a, the air damping effect prevents rotation of the rotational body 4 from fluctuating and decreases vibration and shock caused by the rotational body 4 on the bearings 2 and 3.

Figure 6:
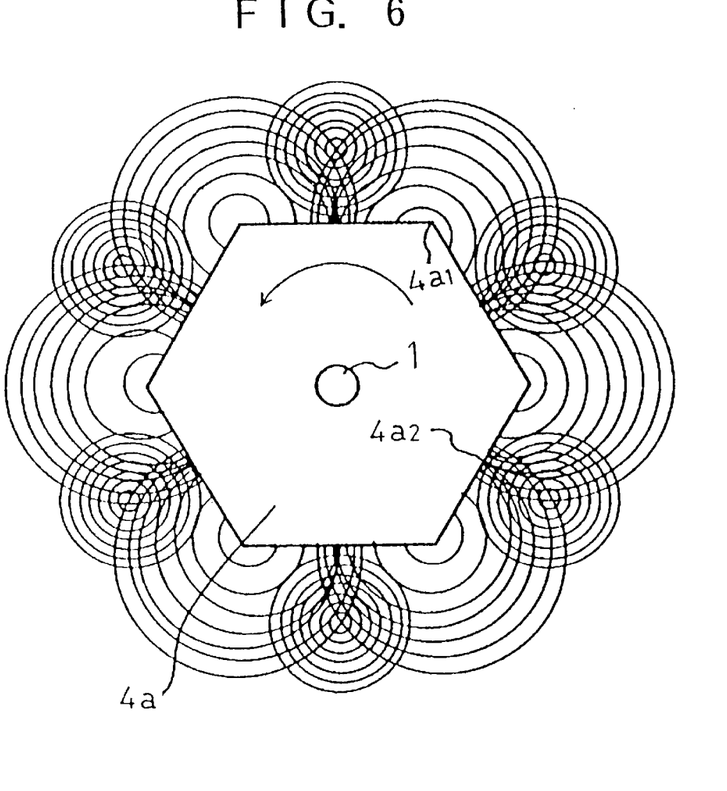
FIG. 6 is a plan view showing an air damping effect of sound occurring at the rotational body.
Figure 7:
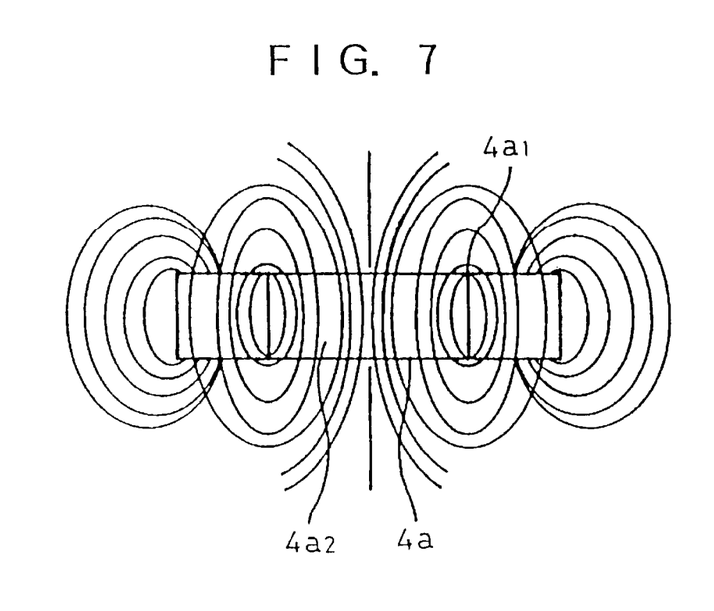
FIG. 7 is a front view of the rotational body shown in FIG. 6.

In the above explanation, the air damping effect occurring at the periphery of the rotational body 4a is explained using air flow occurring around the rotational body 4a. It is also possible to explain using sound pressure as shown in FIGS. 6 and 7.

A sound propagation state is displayed supposing that there is a sound source at the corner portion $4a_1$ of the rotational body 4a. It is considered that the sound pressure of each corner portion $4a_1$ being the sound source becomes large and the sound pressure of each plane portion $4a_2$ becomes small, and that the force shown in FIG. 5 acts upon the rotational body 4a.

Thus it is possible to explain the foregoing by both sound pressure and air flow.

Figure 8:
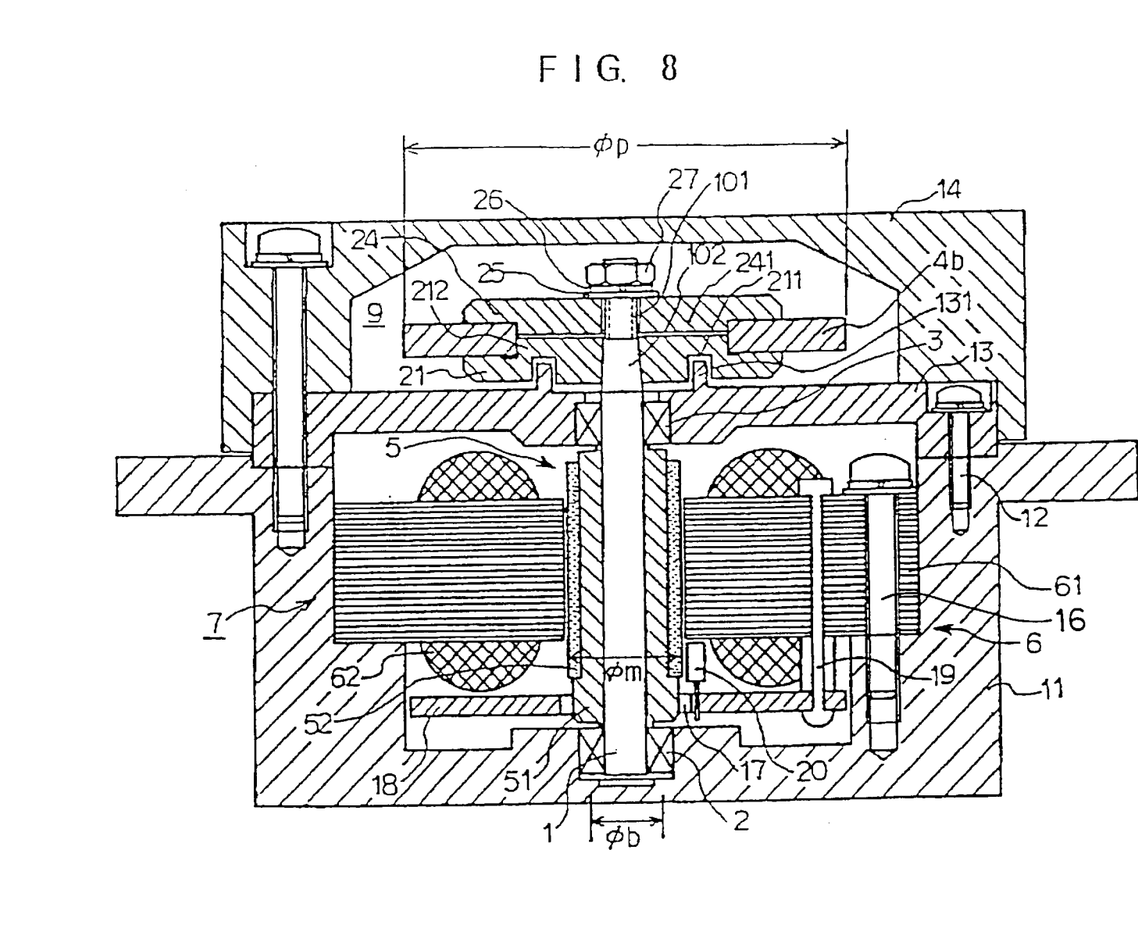
FIG. 8 is a sectional view of the spindle motor which is a form embodying the present invention.

Next, referring to FIG. 8, a suitable form of the embodiment of a spindle motor according to the present invention is described.

FIG. 8 is a sectional view of a spindle motor applied in a polygon scanner motor in an embodiment of the present invention.

The embodiment, as shown in FIG. 8, has an under side case 11 supporting a shaft 1 for free rotation about a rotational axis, a motor 7, a bearing mounting or set plate 13 blocking an open portion of the under side case 11 and a polygon mirror case 14 entirely covering a polygon mirror 4b comprised of a rotational body arranged over the bearing set plate 13. The underside case 11 and the set plate 13 define a housing for supporting the shaft 1 for free rotation.

A bearing 2 is fixed at the bottom of the under side case 11, a bearing 3 is arranged at the center of the bearing mounting plate 13, and the shaft 1 is supported by the bearing 2 and the bearing 3 so as to revolve freely. Although in this example a rolling bearing, such as a ball bearing, is used for the bearings 2 and 3, it is possible to use a slide bearing, a hydrodynamic bearing, or a magnetic bearing instead of the rolling bearing.

A motor rotor 5 comprising a rotor yoke 51 and a rotor magnet 52 are coaxially mounted on the shaft 1 for rotation therewith. The rotor yoke 51 comprises a tubular body fixedly and coaxially mounted at a lower portion of the shaft 1. The rotor magnet 52 comprises a tubular body fixedly and coaxially mounted on the rotor yoke 51.

The motor stator 6 is fixedly mounted in the under side case 11 around the motor rotor 5 mounted on the shaft 1. The motor stator 6 comprises a stator core 61 and a stator coil 62. The stator core 61 is fixed by a bolt 16 at an inner periphery of the under side case 11. The motor 7 comprises the motor rotor 5 and the motor stator 6.

If the motor rotor 5 is of a permanent-magnet rotation type having two poles, the motor stator 6 may be of a core type or a core-less type. If the motor rotor 5 is of a two-pole reluctance type having no permanent-magnet, the motor stator 6 may be of a core type or a core-less type.

A Hall sensor board 18 having a center hole 17 is arranged at the bottom of the under side case 11 and is mounted on the stator core 61 with a mounting or setting bar 19. A Hall sensor 20 is set on the Hall sensor board 18.

An external thread portion 101 is formed at an end of the shaft 1, and next to the external thread portion 101 a taper portion 102 is formed. After a center hole of an under mirror cap 21 is inserted in the taper portion 102 of the shaft 1, the under mirror cap 21 is fixed to the taper portion 102 by tightening a screw in the direction opposite to the direction of normal rotation of the shaft 1.

A cylinder portion 212 is formed integrally with the under mirror cap 21 to define a recess, and a lower half of the center hole of the polygon mirror 4b is inserted in the recess defined by the mirror cap 21 and the cylinder portion 212. In the upper half of the center hole of the polygon mirror 4b is inserted a cylinder portion 241 formed at a lower side of the upper mirror cap 24 inserted on the external thread portion 101 of the shaft 1. Therefore, the polygon mirror 4b is sandwiched between the under mirror cap 21 and the upper mirror cap 24 at both of its surface.

After a plain washer 25 and a spring washer 26 are inserted from the end of the external thread portion 101 of the shaft 1, an internal thread member 27 is screwed on the external thread portion 101. Thus, the polygon mirror 4b is fixed tightly on the shaft 1 through the under mirror cap 21 and the upper mirror cap 24.

As described above, the internal thread member 27 is tightened to the external thread portion 101 of the shaft 1. The external thread portion 101 of the shaft 1 and the internal thread member 27 are formed so that the tightening direction of the internal thread member 27 is opposite to the direction of steady rotation of the shaft 1. If the direction of steady rotation of the shaft 1 is counterclockwise, the screw thread of the internal thread member 27 is formed so as to tighten by clockwise rotation and the screw thread of the external thread portion 101 is formed according to the internal thread member 27.

As the polygon mirror 4b is generally made of aluminum, the under mirror cap 21 and upper mirror cap 24 are also preferably made of aluminum. Although the under mirror cap 21 and the upper mirror cap 24 are used to set the polygon mirror 4b on the shaft 1, it is possible to set the polygon mirror 4b directly on the taper portion 102 of the rotational axis 1 instead.

A circular tubular portion 131 surrounding the bearing 3 is provided around an upper surface, where the bearing 3 is set on, of the bearing setting plate 13, and is loosely inserted in a circular guide 211, without contacting one another, formed at an under side of the under mirror cap 21. Therefore, the circular tubular portion 131 and the circular guide 211 form a labyrinth structure for preventing lubricating oil of the bearing 3 from coming to the side of the polygon mirror 4b.

In the form embodying the present invention, the outer diameter φp of the rotational body 4 is in an upper area of the curve of FIG. 2, and the rotational portions other than the rotational body 4, which are the air gap diameter φb of the bearing 2 (or bearing 3) and the outer diameter φm of the motor rotor 5, are in a lower side of the curve, denoted by the oblique lined area.

Therefore, in the example, the number of rotations is more than 30000 [rpm], the mean outer diameter φp of the polygon mirror 4b is 38 mm, the air gap diameter φb of the bearings 2 and 3 is 10.5 mm, and the outer diameter φm of the rotor magnet 52 is 10.8 mm. These numbers satisfy the above mentioned requirement.

Moreover, as the mean outer diameter φp of the polygon mirror 4b is 38 mm, the air gap diameter φb of the bearings 2 and 3 is 10.5 mm, and the outer diameter φm of the rotor magnet 52 is 10.8 mm in the above-mentioned embodiment, φb/φp=10.5/38=0.286 and φm/φp=10.8/38=0.284 satisfy the requirement of the above-mentioned expressions (2) and (3).

As described above, in the form embodying the present invention, windage loss occurring at the polygon mirror 4b becomes large and the air damping effect acts intensively at the periphery of the polygon mirror by the windage loss at a steady rotation. That acts as an air damper. At the same time, an air damping effect like explained in FIGS. 3 and 4 acts by air flow occurring at surroundings of the polygon mirror 4b. The air damping effect is considered to act more efficiently than in the case of no polygon mirror 4b because the polygon mirror 4b is disposed within a sealed space 9 defined by a polygon mirror case 14. The air damping effect and the air damping effect by the above-mentioned windage loss act upon the polygon mirror 4b together.

Therefore, in the present embodiment, these air damping effects prevent rotation of the polygon mirror 4b from fluctuating, and vibration and shock caused by the polygon mirror 4b on the bearings 2 and 3 decreases. This increases the life of the motor.

In the present embodiment of the invention, the taper portion 102 and the external thread portion 101 are formed on the shaft 1, the center hole of the under mirror cap 21 is positioned over the taper portion 102, and the under mirror cap 21 is fixed to the taper portion 102 by tightening the screw in the opposite direction to the normal rotation of the shaft 1. The center hole of the polygon mirror 4b and the center hole of the upside mirror cap 24 are positioned over the external thread portion 101 so that the polygon mirror 4b is sandwiched between under mirror cap 21 and the upper mirror cap 24, and the internal thread member 27 is tightened on the external thread portion 101. Thus, the polygon mirror 4b is set on the shaft 1.

Therefore, the structure of the spindle motor according to the present invention prevents the polygon mirror 4b from deflecting at its plane because the aligning accuracy is raised, and decreases the rotation fluctuation. Moreover, there is no need to correct the deflection after setting the under mirror cap 21 on the shaft 1, and the accuracy in the labyrinth structure can be kept.

In the form embodying the present invention, since the shaft 1 is fitted with the under mirror cap 21 in taper contact, and the under mirror cap 21 is fixed on the taper portion 102 with the screw tightened in the opposite direction to the direction of steady rotation of the shaft 1, the under mirror cap 21 reinforces lightness cutting into the taper portion 102 during rotation. Therefore, if a junction portion of the taper portion 102 of the shaft 1 and the under mirror cap 21 runs hot, the junction portion does not become loose when the temperature of the junction falls. That point is effective especially when the materials and the coefficients of expansion are different for the taper portion 102 and the under mirror cap 21, such as iron for the taper portion 102 and aluminum for the under mirror cap 21.

As the polygon mirror 4b does not become loose from the shaft 1, windage loss gained by rotation of the polygon mirror 4b is used efficiently.

As described above according to the present invention, windage loss occurring at the polygon mirror becomes large and the air damping effect acts intensively at the periphery of the rotational body by the windage loss during steady rotation which acts as air damper. As the air damping effect prevents rotation of the rotational body from fluctuating and decreases vibration and shock caused by the rotational body to the bearing, a motor having a small rotation fluctuation, a miniaturized size, and a long life is realized under the requirement of accelerating rotation.

In the present invention, as the taper portion is formed on the shaft 1, the taper portion is fitted with a center hole of the rotational body, and the rotational body is tightly fixed to the taper portion in the direction opposite to the direction of steady rotation of the shaft. Thus the aligning accuracy when the rotational axis is fitted with the rotational body is good, and the rotational body does not become loose from the shaft at accelerating rotation.

In the present invention, as the polygon mirror used for the rotational body is covered by a case, there are acting both the air damping effect caused by windage loss and the air damping effect caused by air flow occurring at surroundings of polygon mirror. By both of these air damping effects, the effect of the present invention is sure to be realized.

In the present invention, a polygon mirror and a fitting portion fitting the polygon mirror are used for the rotational body, the fitting portion is tightened to the taper portion of rotational body, and the polygon mirror is fitted with the fitting portion. Therefore, the accuracy of correcting deflection when the rotational body is fitted with the fitting portion is good and the polygon mirror does not become loose from the rotational body.

What is claimed is:

1. A spindle motor comprising:
   a shaft supported by bearings for free rotation about a rotational axis; a rotational body and a motor rotor coaxially mounted on the shaft for rotation therewith; and a motor stator fixedly mounted around the motor rotor; wherein the outer diameter of the rotational body is determined so that a windage loss of the rotational body is proportional to the third power of a peripheral velocity of the rotational body, and the air gap diameter of the bearings and the diameter of the motor rotor are determined so that the air loss of each of the bearings and the motor rotor is proportional to the square of the peripheral velocity of each of the bearings and the motor rotor at a range of constant speed of rotation of the shaft.

2. A spindle motor according to claim 1; wherein the rotational body has a central bore, and the shaft has a taper portion extending into the central bore for fixedly mounting the rotational body to the shaft, the rotational body being fixed to the taper portion of the shaft by a screw which is tightened in a direction opposite to the normal direction of rotation of the shaft.

3. A spindle motor according to claim 1 or 2; wherein the rotational body comprises a polygon mirror.

4. A spindle motor according to claim 1 or 2; wherein the ratio $\phi b/\phi p$ of the air gap diameter $\phi b$ of the bearings to the outer diameter $\phi p$ of the rotational body is limited to the following expression:

$$\phi b/\phi p \leq 1/3,$$

and the ratio $\phi m/\phi p$ of the outer diameter $\phi m$ of the motor rotor to the outer diameter $\phi p$ of the rotational body is limited to the following expression:

$$\phi m/\phi p \leq 1/3.$$

5. A spindle motor according to claim 2; wherein the rotational body comprises a polygon mirror and a mounting portion for mounting the polygon mirror to the shaft, the mounting portion being fixedly mounted to the taper portion of the shaft by the screw.

6. A spindle motor according to claim 3; further comprising a case for covering the polygon mirror.

7. A spindle motor according to claim 1; further comprising mounting means for mounting the rotational body to the shaft.

8. A spindle motor according to claim 7; wherein the mounting means comprises a central bore extending through the rotational body for receiving a portion of the shaft, and a securing member for securing the rotational body to the portion of the shaft for rotation therewith.

9. A spindle motor according to claim 8; wherein the portion of the shaft is tapered, and the central bore of the rotational body has a tapered portion for receiving the tapered portion of the shaft.

10. A spindle motor according to claim 9; wherein the rotational body comprises a first cap member, a second cap member disposed over the first cap member, and a plate member fixedly supported between the first and second cap members.

11. A spindle motor according to claim 10; wherein the first and second cap members define a recessed portion receiving a portion of the plate member.

12. A spindle motor according to claim 10; wherein the plate member comprises a polygon-shaped mirror.

13. A spindle motor comprising: a housing; a rotational member rotatably mounted in the housing; and a rotational body mounted on the rotational member for rotation therewith, the rotational body having an outer diameter such that a windage loss of the rotational body is proportional to the third power of a peripheral velocity of the rotational body.

14. A spindle motor according to claim 13; further comprising a plurality of bearings fixedly mounted to the housing for rotationally supporting the rotational member; a motor rotor mounted on the rotational member for rotation therewith; and a motor stator mounted on the housing and around the motor rotor; wherein the bearings have an air gap diameter and the motor rotor has a diameter such that air loss of each of the bearings and the motor rotor is proportional to the square of a peripheral velocity of each of the bearings and the motor rotor at a range of constant rotational speeds of the rotational member.

15. A spindle motor according to claim 14; wherein the ratio $\phi b/\phi p$ of the air gap diameter $\phi b$ of the bearings to the outer diameter $\phi p$ of the rotational body satisfies the following expression:

$$\phi b/\phi p \leq 1/3,$$

and the ratio $\phi m/\phi p$ of the outer diameter $\phi m$ of the motor rotor to the outer diameter $\phi p$ of the rotational body satisfies the following expression:

$$\phi m/\phi p \leq 1/3.$$

16. A spindle motor according to claim 14; further comprising mounting means for mounting the rotational body to the rotational member.

17. A spindle motor according to claim 16; wherein the mounting means comprises a central bore extending through the rotational body for receiving a portion of the rotational member, and a securing member for securing the rotational body to the portion of the rotational member for rotation therewith.

18. A spindle motor according to claim 17; wherein the portion of the rotational member is tapered, and the central bore of the rotational body has a tapered portion for receiving the tapered portion of the rotational member.

19. A spindle motor according to claim 18; wherein the rotational body comprises a first cap member, a second cap member disposed over the first cap member, and a plate member fixedly supported between the first and second cap members.

20. A spindle motor according to claim 18; wherein the plate member comprises a polygon-shaped mirror.

21. A spindle motor comprising: a rotational member supported by bearings for free rotation about a rotational axis; and a rotational body mounted on the rotational member for rotation therewith, the rotational body having an outer diameter preselected to make a windage loss of the rotational body proportional to the third power of a peripheral velocity of the rotational body.

22. A spindle motor according to claim 21; further comprising a motor rotor mounted on the rotational member for rotation therewith; and a motor stator mounted around the motor rotor; wherein the bearings have an air gap diameter and the motor rotor has a diameter such that air loss of each of the bearings and the motor rotor is proportional to the square of a peripheral velocity of each of the bearings and the motor rotor at a range of constant rotational speeds of the rotational member.

23. A spindle motor according to claim 22; wherein the ratio $\phi b/\phi p$ of the air gap diameter $\phi b$ of the bearings to the outer diameter $\phi p$ of the rotational body satisfies the following expression:

$$\phi b/\phi p \leq 1/3,$$

and the ratio $\phi m/\phi p$ of the outer diameter $\phi m$ of the motor rotor to the outer diameter $\phi p$ of the rotational body satisfies the following expression:

$$\phi m/\phi p \leq 1/3.$$

24. A spindle motor according to claim 21; wherein the rotational body comprises a polygon mirror.

* * * * *